United States Patent [19]

Maguire

[11] Patent Number: 4,909,529
[45] Date of Patent: Mar. 20, 1990

[54] BICYCLE WITH BELT DRIVE

[76] Inventor: Lowell L. Maguire, 836 'M' St. #307, Anchorage, Ak. 99501

[21] Appl. No.: 250,444

[22] Filed: Sep. 28, 1988

[51] Int. Cl.$^4$ .............................................. B62M 1/02
[52] U.S. Cl. .................................................... 280/261
[58] Field of Search ....................... 280/236, 261, 238; 74/318, 319

[56] References Cited

U.S. PATENT DOCUMENTS

| | | | |
|---|---|---|---|
| 2,274,512 | 2/1942 | Weimer | 74/230.5 |
| 3,453,900 | 7/1969 | Orndorff | 74/219 |
| 3,926,020 | 12/1975 | Dantowitz et al. | 74/217 B |
| 3,934,481 | 1/1976 | Foster | 74/190.5 |
| 4,005,611 | 2/1977 | Jeffries | 74/416 |
| 4,029,332 | 6/1977 | Davis | 280/234 |
| 4,070,919 | 1/1978 | Ummen et al. | 74/229 |
| 4,119,326 | 10/1978 | Porter | 280/236 |

Primary Examiner—Charles A. Marmor
Assistant Examiner—Richard Lamby
Attorney, Agent, or Firm—William D. Hall

[57] ABSTRACT

A bicycle has a belt and pulleys in place of the usual chain and sprockets. Each pulley has three (more of less) raceways separated by discs (pulley walls). The discs (pulley walls) have openings that permit the belt to be shifted from one raceway to another raceway. A rotatable arm pivoted to the frame of the bicycle controls the shifting of the belt to the desired raceways. One end of the arm applies lateral pressure to the belt just before it arrives at the pulley associated with the driving pedals of the bicycle, to shift raceways for the driving pulley. Similarly the other end of the arm applies lateral pressure to the belt just before it enters the driven pulley to shift raceways of that pulley. Each end of the arm is biased by a main spring to apply vertical pressure to the belt to maintain it tight.

24 Claims, 12 Drawing Sheets

BICYCLE WITH BELT DRIVE

BACKGROUND OF THE INVENTION

Bicycles with a belt drive instead of a chain drive are well known. For example, U.S. Pat. No. 4,119,326 to John F. Porter issued Oct. 10, 1978, and entitled Variable Speed Bicycle, teaches a bicycle power train comprising variable speed pulleys and a belt. This patent has a single raceway for the pulley driven by the pedals and a single raceway for the driven pulley that rotates with the rear wheel. The widths of these raceways vary in order to change the speed of the bicycle.

SUMMARY OF THE INVENTION

The present invention relates to a bicycle with a power train that has a first pulley driven by the pedals and a second pulley connected to and rotating with the rear wheels. A belt connects the two pulleys. Each pulley has two or more raceways. Each pulley has a disc separating adjacent raceways. Each disc has an opening in the form of a cut-away portion of the disc which allows the belt to be shifted from one raceway to another.

A common control means shifts the belts between raceways and also keeps the belt tight. This common control means is an elongated arm pivoted to the frame at about midway of its length. A limited portion of the arm near each end may be moved, under control of the rider, laterally to shift the belt from one raceway to another.

The arm, therefore, has a central portion pivoted to the frame, and two limited portion, one near each end.

One of these limited portion engages the belt along its travel, and applies lateral pressure to the belt to shift it from one to another of the raceways of the driving pulley. The other limited portion similarly engages the belt along its lower level of travel to move the belt laterally as required to shift from one to another of the raceways of the driven pulley.

The central portion of the arm is, as stated above, pivoted to the frame. The limited portions are pivotally connected to the central portion and may be moved laterally, to shift the belt, by a control wire that may be operated by the rider.

The arm is biased for rotation so that one of said limited portions applies downward pressure to the belt along its upper path and the other one of said limited portions applies upward pressure to the belt along its lower path of travel. The aforesaid upward and downward pressures on the belt keep it tight while the bicycle is in motion. The arm has a rubber or flat spring steel insert in the top section to allow most of the slack to be taken up by the lower arm.

The raceways have slots in them and the belt has cleats complementary to the slots to prevent slippage. Such belts are often called cogged or lugged belts.

The detailed disclosure explains how the invention can replace the chain drive system of existing bicycles and also explains how new bicycles may be manufactured to embody the invention.

The broadest aspects of the invention extend to single speed bicycles and to bicycles where different speeds may be selected at the rear axle for example. In such cases a single arm may be arranged to keep the belt tight.

BRIEF DESCRIPTION OF THE DRAWINGS

FIG. 13 illustrates the preferred orientation of the spool, the pulley and the belt with respect to each other, and the preferred orientation of the shifting and adjusting arms.

FIG. 13A illustrates the shifting process.

FIG. 13B illustrates the slack adjustment process.

FIG. 14 depicts tubular cable housing mounted on the bicycle frame.

FIGS. 15 to 15D, illustrate belt installation.

DETAILED DESCRIPTION OF THE PREFERRED EMBODIMENTS

Figure 1:
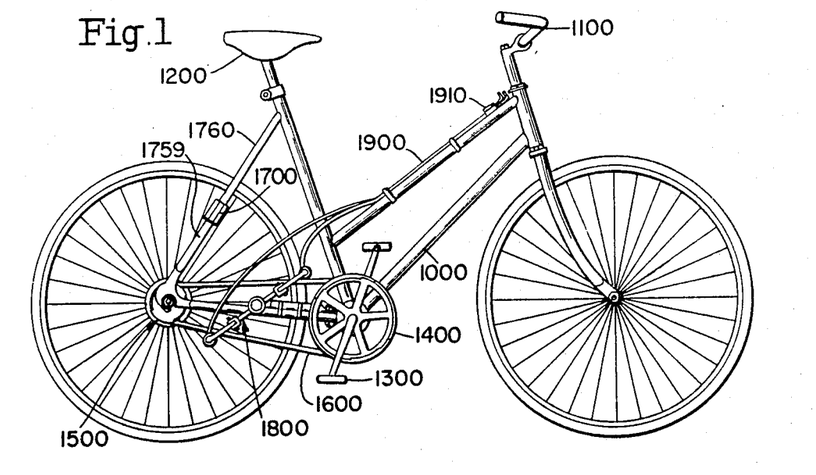
FIG. 1 is a bicycle employing the V-belt pulley system.

Referring now to FIG. 1, a pulley/V-belt conversion system for a bicycle in which my V-belt drive is substituted for the chain drive of a previously built bicycle, will now be explained.

The bicycle is provided with a frame 1000, handle bars 1100, a seat 1200 and pedals 1300. A further feature of the bicycle is the V-belt/pulley system which is comprised of a front pulley 1400, rear pulley 1500, V-belt 1600, slack adjusting and shifting arms 1800 and shifting cable 1900.

Figure 2:
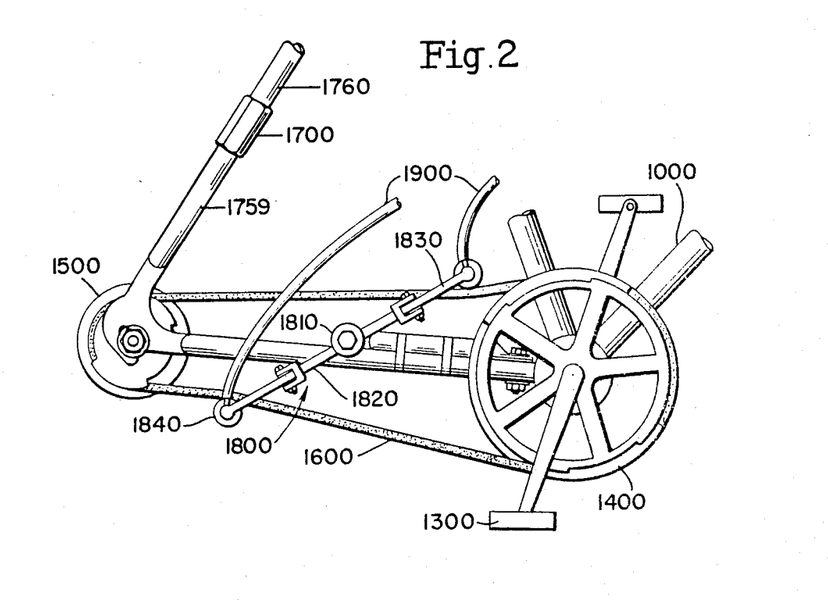
FIG. 2 illustrates an enlarged view of the pulley V-belt system of FIG. 1.
Figures 9, 11, 11A, 12:
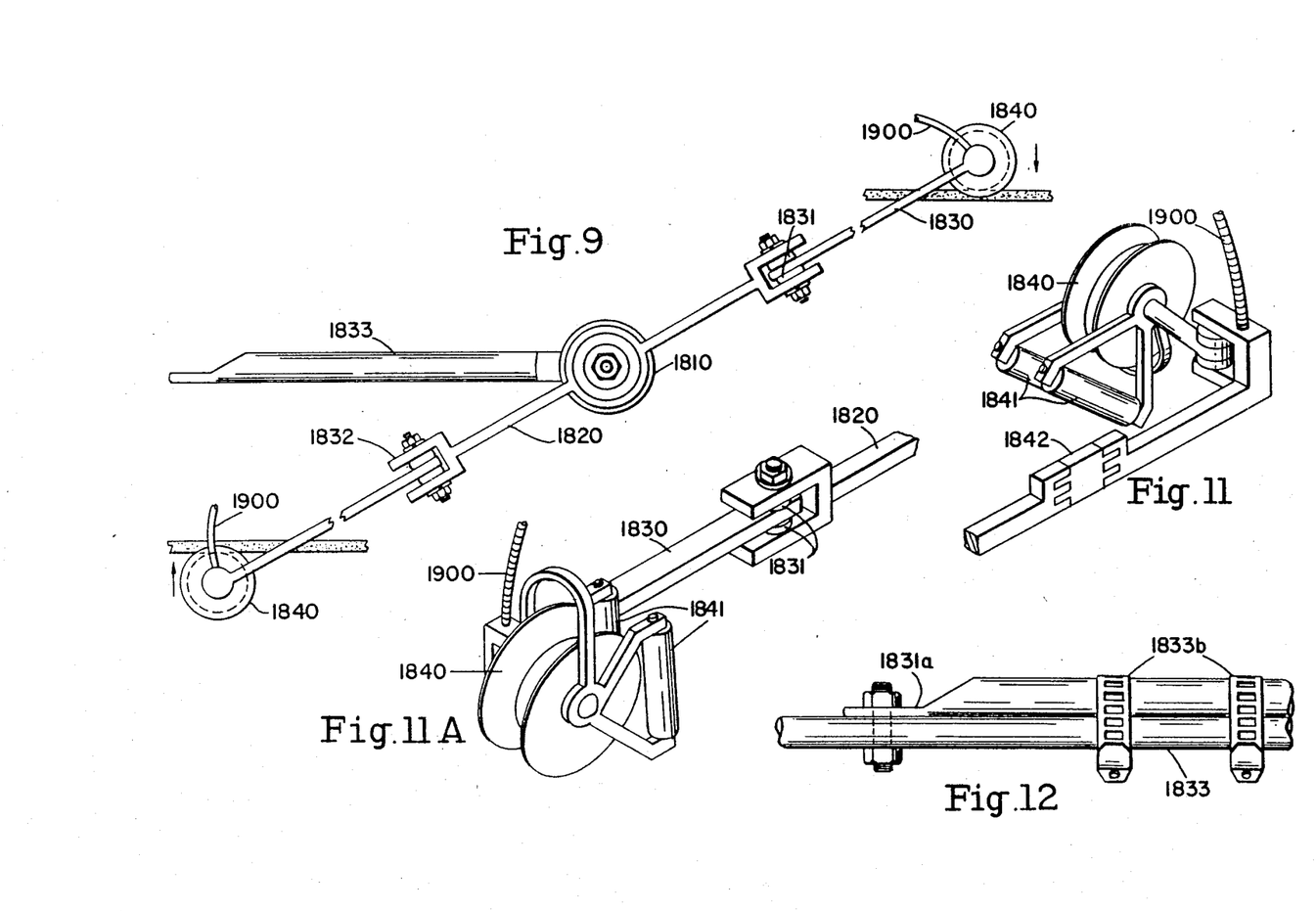
FIG. 9 is a front view of the slack adjusting and shifting apparatus.
FIG. 11 is a roller and spool assembly.
FIG. 11A is a roller and spool assembly connected
FIG. 12 is a metal tube-like mount for the slack adjusting and shifting appartus.

FIGS. 2 and 9 depict an enlarged side view of the pulley/V-belt system.

A tension wheel 1810 couples the slack adjusting arm 1820, to the metal mounting tube 1833. The shifting arms 1830 and the slack adjusting arm 1820 are connected by the forks 1831, 1832, located at the end of each slack adjusting arm. In order to apply pressure and shifting action on the V-belt 1600, belt riding spools 1840 are attached to the ends of the shifting arms 1830. The outer walls of the spools are deep enough to receive the top portion of the V-belt and hold it in position. Located just behind the spools 1840 and fastened to the shifting arms 1830 are shifting cables 1900, which have the strength characteristics, and the flexibility, of an automotive emergency brake cable.

Figure 3:
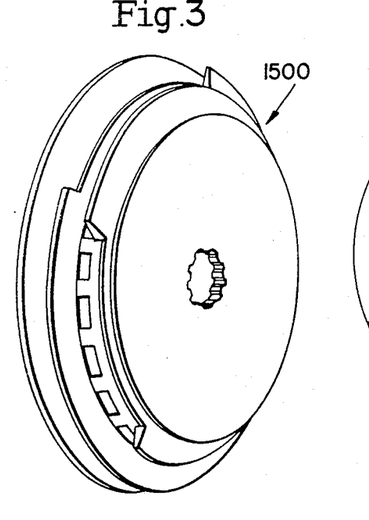
FIGS. 3 and 3A depict a front isometric view and a front view of the rear multiple pulley.
Figure 3A:
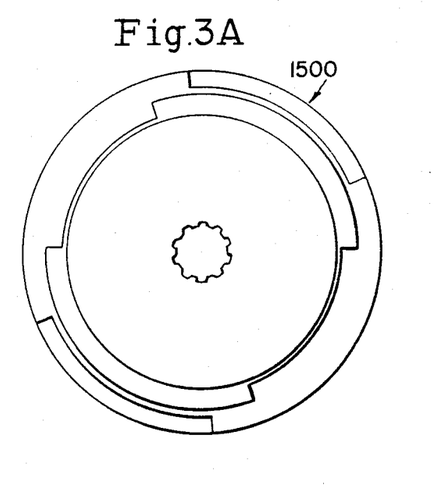
Figures 4, 4A:
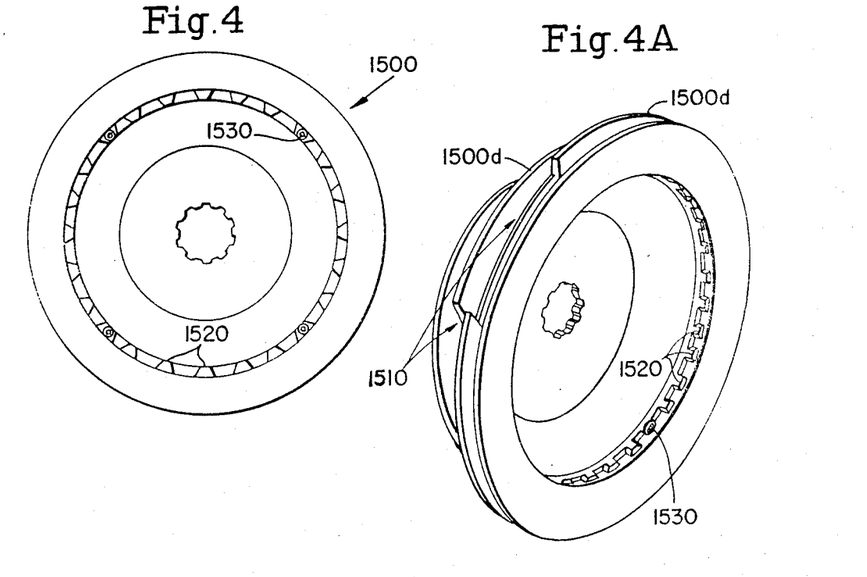
FIGS. 4 and 4A depict a rear view and a rear isometric view of the rear multiple pulley.

FIG. 3 is a front isometric view of the rear pulley 1500. FIG. 3A is a direct front view of the rear pulley, and FIG. 4 is a rear view of the rear pulley 1500. FIG. 4A details the design of the rear pulley 1500. Shifting slots 1510 are located 90° to 180° apart in each of the inner pulley walls or discs. A minimum length of 70° per slot 1510 will facilitate smooth and split second shifting, also without creating excessive side wall belt wear. Slightly raised edges at the sides of the shifting slots prevent belt wobble or jumping during shifting.

Figure 5:
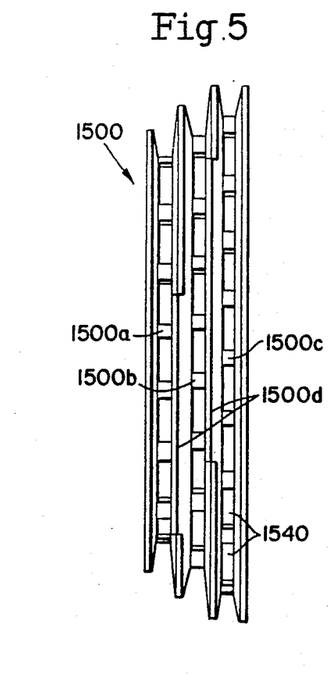
FIG. 5 is a top view of the rear multiple pulley.
Figure 5A:
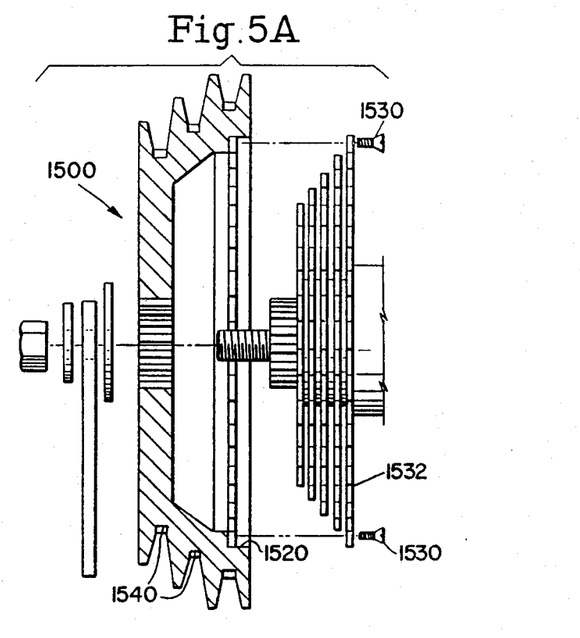
FIG. 5A illustrates how the rear multiple pulley can be mounted over an existing sprocket.
Figure 5B:
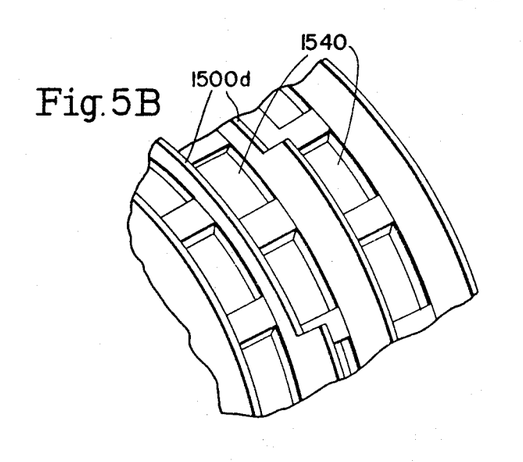
FIG. 5B is an enlarged view of the raceways in the pulley.
Figure 6:
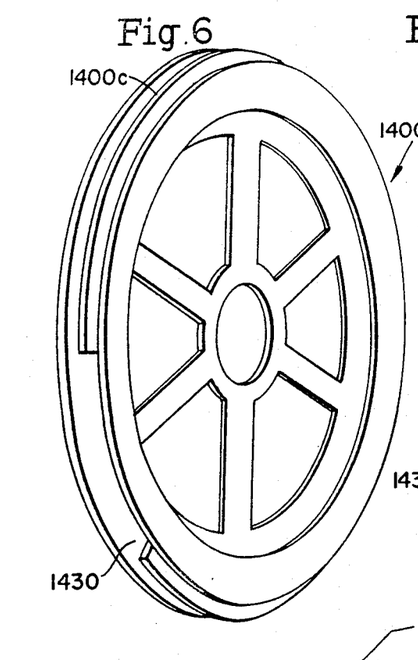
FIGS. 6 and 6A illustrate rear isometric and front isometric views of the front multiple pulley.
Figure 6A:
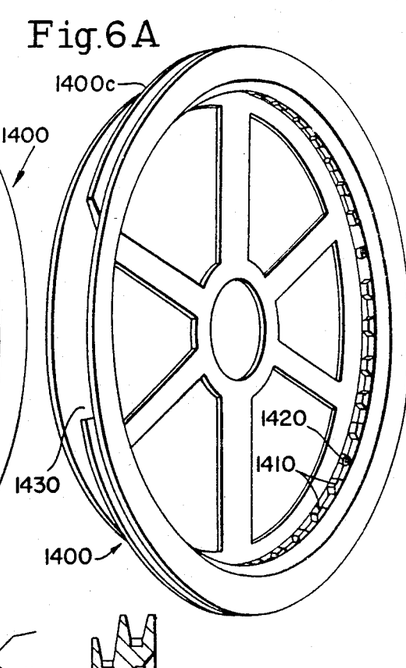
Figure 7:
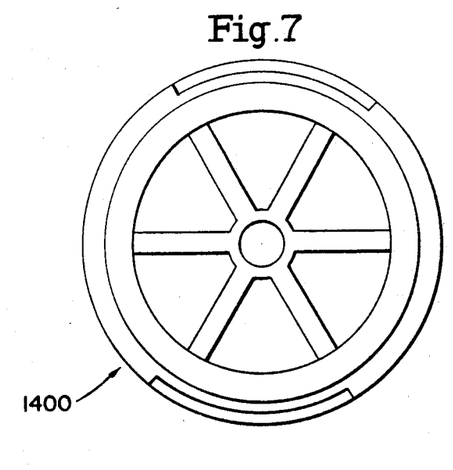
FIGS. 7 to 7B depict the front, top and rear views of the front multiple pulley.
Figure 8:
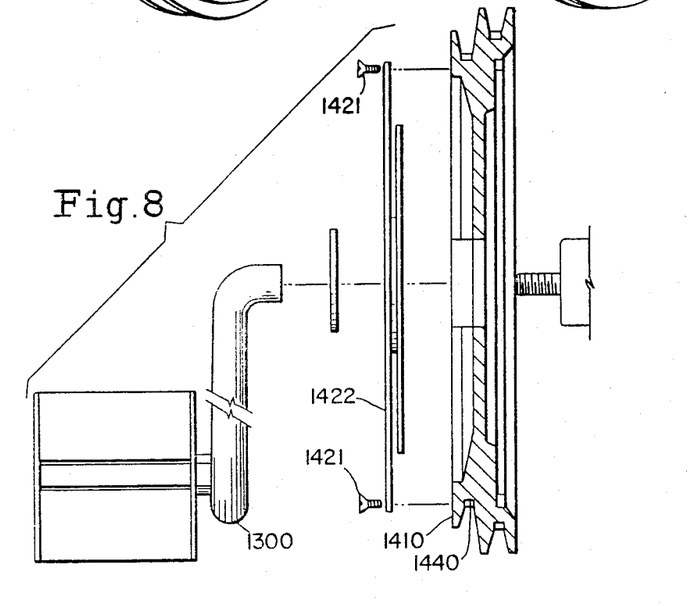
FIG. 8 illustrates how the front multiple pulley can be mounted to the existing gear.

The rear pulley 1500 is preferably cast and machined in close accordance with the sprocket cluster of the previously built bicycle, that it will fit over or replace. The axle opening is to be splined, keyed or otherwise machined, to match the existing member for a slide-on fit. The rear inner wall must be keyed and therefore has ridges, 1520, to mesh with the first and largest sprocket closest to the spokes. Four set screw holes 1581 are located at 90° angles to each other, to receive set screws 1531 which aid in securing the pulley 1500 to the sprocket, assembly (FIG. 5A) on pre-existing bicycles. For new bicycles, the meshed inner wall and the set screws 1531 are not necessary. FIG. 5 is an end view of the rear pulley 1500 showing that the width of the raceway converges in a V-shape and thus V-belt 1600 fits snugly therein. FIGS. 5A and 5B illustrate depressions or openings 1540 in the raceway channels to complement the lugs or cleats 1610 (FIG. 16) on the underside of the V-belt 1600 to reduce slipping. Referring now to FIGS. 6 through 8, the front pulley 1400 is designed with the same features as the rear pulley 1500 as described above. It is installed on the bicycle with the smallest raceway of the pulley toward the frame 1000 (FIG. 1). This is in reverse of the rear pulley and the same as what is found on bicycles employing the existing chain/sprocket system. Installation of the converting type unit is identical in method to the rear pulley. The shifting slots 1430 (FIG. 6A) can be either two at 180° apart, located at inner pulley walls (discs) or three at 120° apart. Many other angles can be used, for example 90°. This is a shifting speed option that can be offered to the operator at the time of purchase.

Figure 7A:
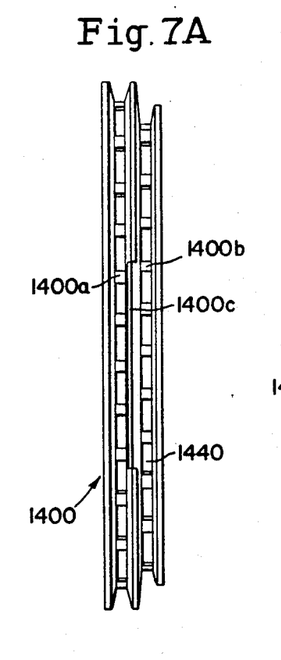
Figure 7B:
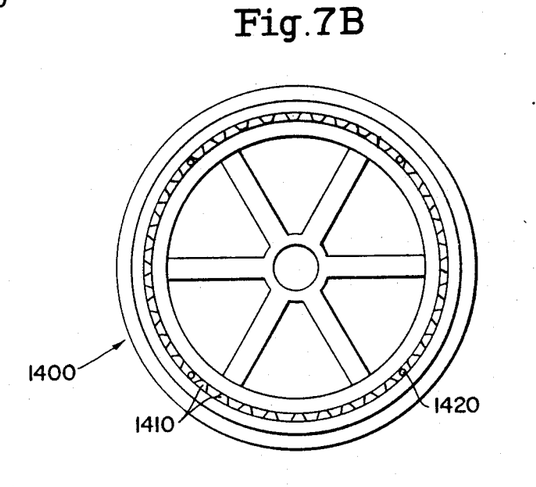

The rear pulley 1500 preferably has three raceways 1500a, 1500b and 1500c (located in different parallel vertical planes), separated by discs or partitions 1500d in which the shifting slots 1510 are located (See FIGS 4A and 5). The front pulley 1400, of FIG. 6, 6A and 7A, has two raceways 1400a and 1400b (located in different parallel vertical planes), separated by a disc or partition 1400c having a shifting slot 1430 in it.

Figures 10, 10A, 10B:
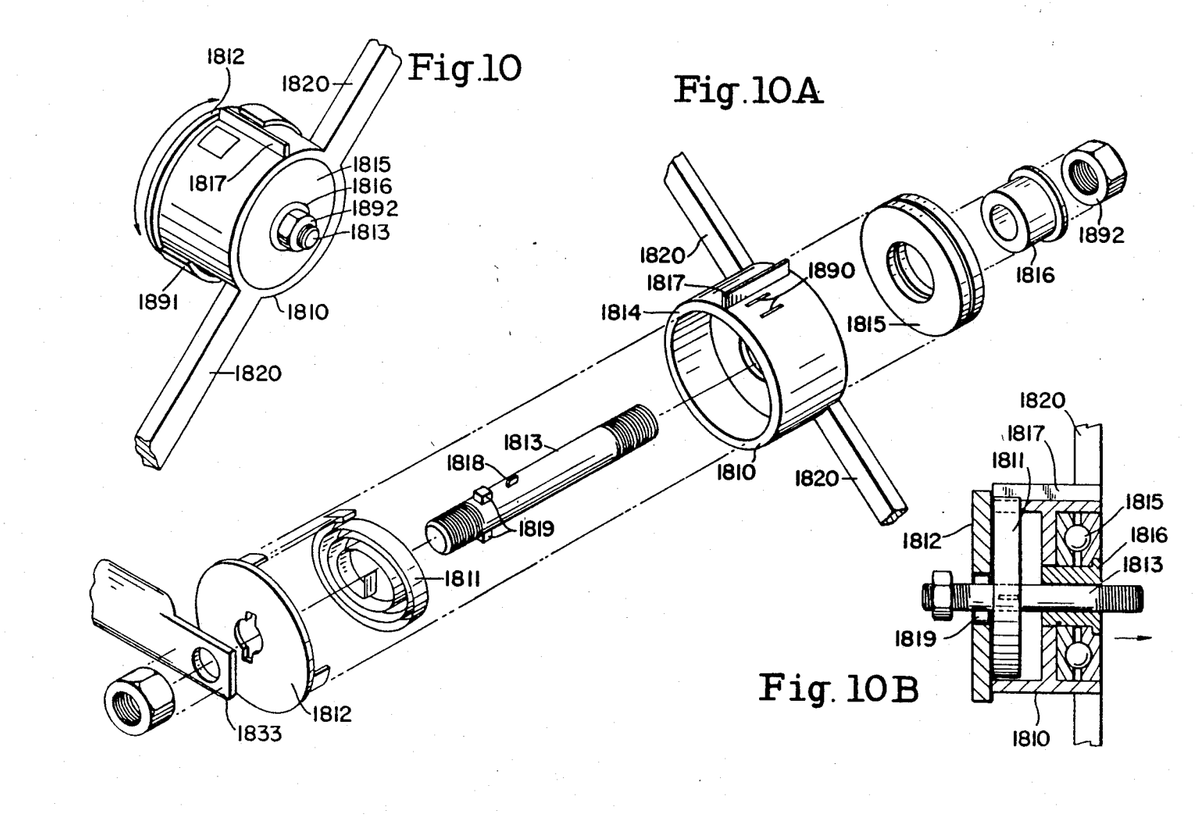
FIG. 10 is a front isometric view of the tension wheel.
FIG. 10A depicts the various components of the tension wheel.
FIG. 10B is a cross sectional view of the tension wheel.

Since the V-belt 1600 must be long enough to fit around the raceways with the largest diameter in each pulley, slack will occur when shifting to smaller diameter raceways. A device to remove the slack and to also work as a belt a shifter has been designed as part of the system as shown in FIG. 9. For the device to work properly there must be constant vertical pressure on the upper and lower portions of the V-belt to avoid belt slack. This pressure is produced by the tension wheel 1810. (FIG. 9). As shown in FIGS. 10, 10A and 10B, the tension wheel 1810 is located in a cylindrically shaped top housing 1814 that fits inside a slightly larger diameter bottom housing 1812. The front portion of the top housing contains bearings 1815 and a bushing 1816. A retaining bolt 1113 is also placed through the tension wheel. The bearings 1815 and bushing 1816 allow the top housing 1814 to spin freely in the bottom housing 1812. Along the bottom end of the bolt 1813 is a raised nib 1818 that anchors the inner end of a spiral spring 1811. One end of the smooth length of the bolt has keys 1819 for locking into the bottom housing 1812. This keeps the bolt 1813 from spinning and allows the prewound spiral spring 1811 to uncoil. The outer end of the previous spiral spring 1811 is anchored into two slots 1890 in the top housing wall. The spring 1811 controls the rotation of the top housing 1814. The spiral spring 1811 is coiled in the counter clockwise direction (when viewed from the right). The uncoiling force of the spiral spring 1811 will produce the needed pressure to the slack adjusting arms 1820. The top housing 1814 has a stop stem 1817. The keys 1819, when the apparatus is assembled, engage keyhole 1893 to prevent the inner end of spring 1811 from rotating. The stopping stem 1817 will engage collar 1891 and keep the top housing 1814 from spinning and allowing the spiral spring 1811 to uncoil in the event the belt 1600 jumps off the pulleys or if the spools 1840 jump off of the belt 1600. By unscrewing the rear nut 1892 behind the bottom housing 1812, the center spring retaining bolt 1813 can be pulled to the right (FIG. 10A) to unlock the keys 1819 from keyhole 1893, and permit rotation of bolt 1813 whereby the initial tension of spring 1811 may be adjusted.

Integral with the tension wheel 1810, are the slack adjusting arms 1820. They are located 180° apart and are symmetrical about the center line of the tension wheel 1810. The forks 1831, 1832 (FIG. 9, 11A) at the end of each arm 1820 connect arms 1820 to the shifting arms 1830. With the use of Teflon washers 1881, or sealed bearings, the shifting arms 1830 are capable of horizontal movement independent of the slack adjusting arm 1820. But any vertical movement will occur with both arms 1820 and 1830 acting as one entity. That is to say when the spring 1811 rotates arms 1820, the entire assembly 1820, 1830 and 1840 rotates clockwise (FIG. 9) to apply pressure to the belt.

Fastening the apparatus of FIG. 9 to the bicycle is achieved by using the metal tubing 1833 (FIG. 12). The flattened end 1833a of the tubing 1833 can be bolted to the frame 1000 of the bicycle. Simple adjustable hose clamps 1833b are tightened around the length of the tubing, and the appropriate frame member to further secure tube 1833 to the frame 1000.

The shifting and adjusting processes require a degree of lateral movement of the spools 1840 as well as the shifting arms 1830. As shown in FIGS. 11 and 11A, the spool shaft 1843 is flattened at the end 1844 and positioned between teflon washers 1845 as bearings that allow the spool 1840 to pivot up to 30° to the right or left. The safety loop and rollers 1841 keep the V-belt aligned on the spool 1840 during shifting. Rubber inserts 1842 in the upper shifting arm 1830 allow the arm to bend a small amount thereby equalizing the tension on the upper portion of the V-belt 1600. The shifting arm 1830, however, retains free movement in the horizontal direction independent of the slack adjustment arm 1820. All vertical motion is restricted unless the slack adjustment arms 1820 move.

Figures 13, 13A, 13B, 14, 15A:
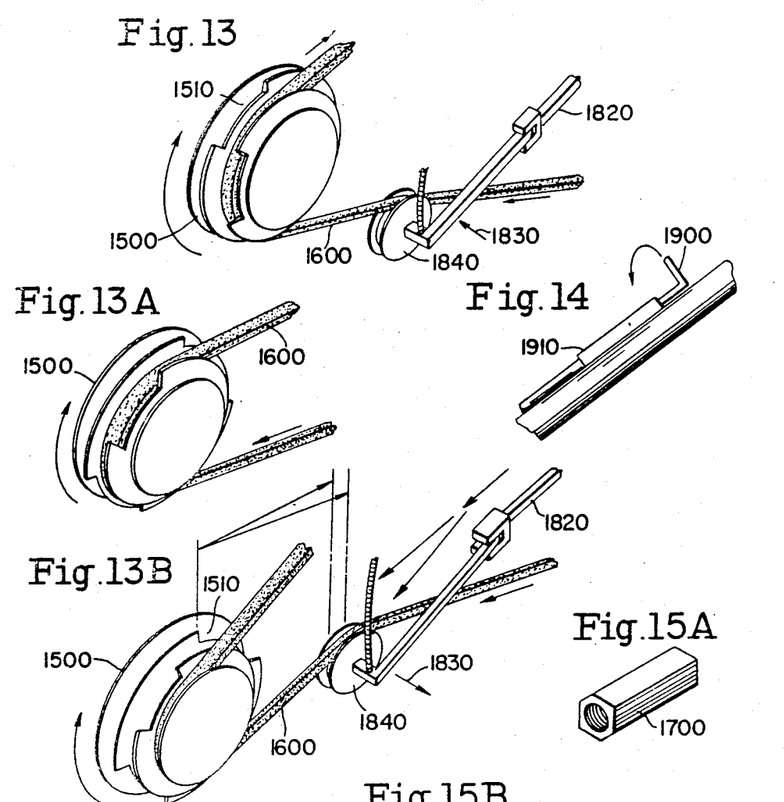

The shifting process will now be described with reference to FIGS. 13, 13A, 13B and 14. In FIG. 13, the V-belt is operating in the middle raceway of pulley 1500. The centerline through the two pulleys is in the middle of this raceway. At this point the slack adjusting arm 1829 and the shifting arm 1830 should be in alignment with each other. The belt riding spools 1840 should be centered on the belt 1600.

Accurate positioning of the centerlines accomplishes two things: the shifting arms 1830 will have a minimum amount of travel to the left or right during shiftings and the belt riding spools 1840 will have the least amount of belt drag against its side walls. Even so, the belt will, like its counterpart, the chain drive, be slightly out of line on some shifts. FIG. 13A has the V-belt 1600 proceeding to the adjacent pulley. The belt riding spool 1840 has responded to the operator's adjustment of the cable and has applied lateral pressure to the V-belt 1600. The V-belt 1600 is now under lateral pressure from the spool 1840 to move in a horizontal direction. The operator will feel a slight and instant pressure on the adjustment means 1900. That is, the V-belt is being forced against the vertical wall of the pulley 1500. As a shifting slot or opening 1510 rotates and makes contact with the V-belt 1600, it will be positioned horizontally at such an angle as to slip across the slot 1510. The shifting slot snags the narrow belt bottom and shifts it onto the desired pulley. The second vertical edge at the end of the slot 1510 will flip the V-belt 1600 onto the adjacent raceway. There will no longer be pressure felt by the operator and this constitutes a signal that shifting is completed. The sequence works just as smoothly and quickly in the opposite direction from a smaller to a larger raceway. FIG. 13B captures the orientation an instant later as the slack adjusting arms 1820 move in the clockwise direction due to the tension exerted by the tension wheel 1810. The result is vertical pressure on the V-belt, and the slack that was created after shifting has been removed. The spools 1840 will have moved about their forks 1831 and 1832, so that the spools 1840 are now duly aligned with the new position of the belt 1600.

FIG. 14 shows the metal tubing 1910 which houses both the front and rear shifting cables 1900. The metal tubing is constructed so as not to inhibit either cable from movement left or right.

Figure 15:
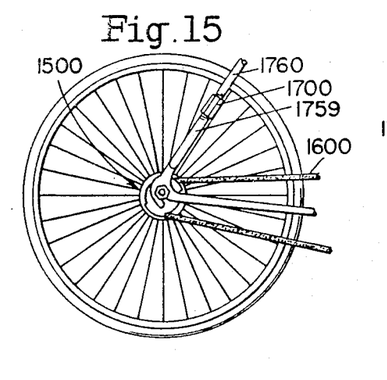
Figures 15B, 15C, 15D:
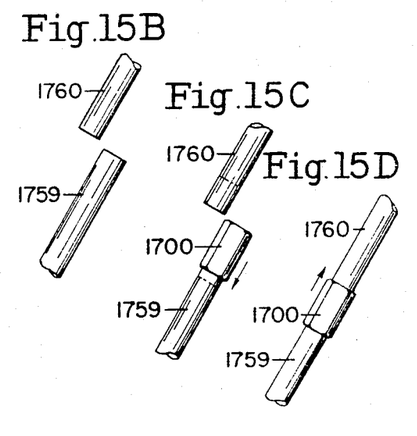

The V-belt installation will now be discussed with reference to FIG. 15 to 15D. For proper installation on a bicycle that previously had a chain drive, the seat post or rear axle frame member 1759, 1760 shown in FIG. 15C must be severed at mid-length. A single wheel tubing cutter is the best tool for the job. A self-threading couple 1700 is screwed on the bottom member until the top of the coupler 1700 and the top of the member match. The upper cut member is then marked at a distance of half the coupler length as shown in FIG. 15C. The top member is then subsequently realigned to the top of the coupler, and the pieces are joined up to the mark. The coupler 1700 is preferably the exact correct size for the converted bicycle.

Figure 16:
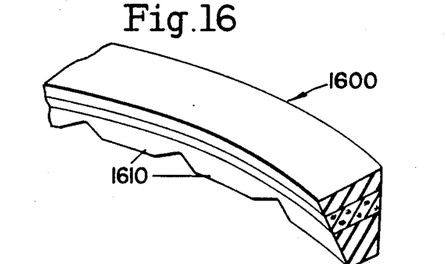
FIGS. 16, 16A and 16B illustrate three belts of varying size and composition.
Figure 16A:
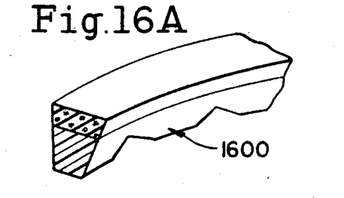
Figures 16B, 17, 17A:
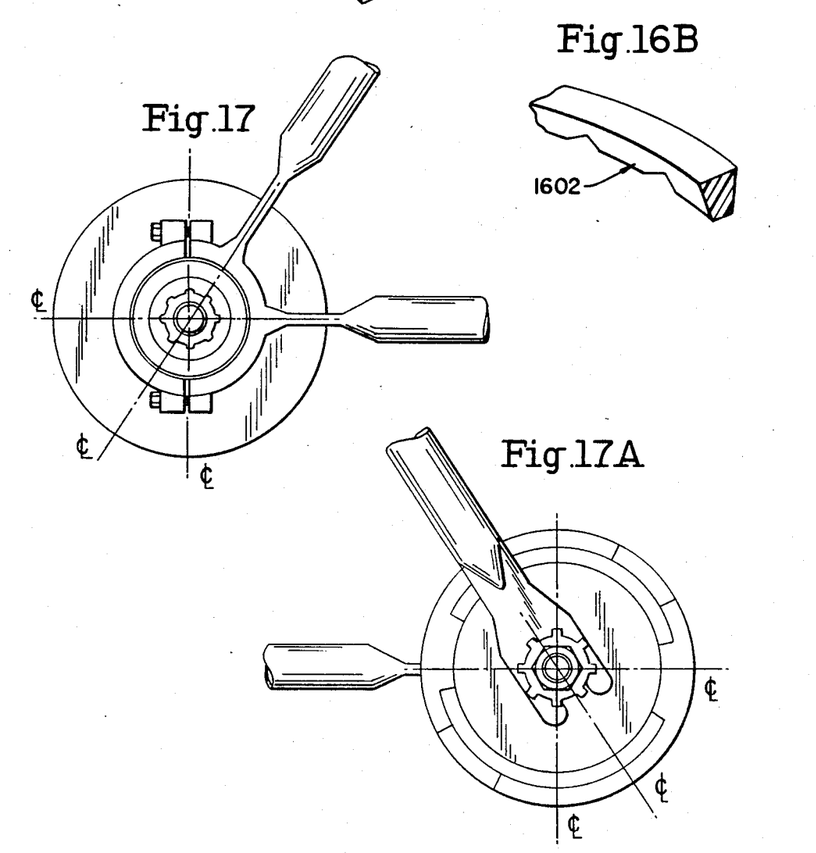
FIG. 17 is a side view of the rear multiple pulley.
FIG. 17A is a side view of the front multiple pulley.

As for the belt itself, FIG. 16 illustrates the basic composition and configuration. Lugs 1610 are carved into the bottom portion of the V-belt to mate with the depression 1440 (FIG. 5, 7A) in the raceways of the pulleys, thus preventing slippage. In this embodiment (FIG. 16) the lugs 1610 are ¾ inches in length and 7/16 inches in width. The belt itself is the same width of the lugs and is approximately ⅜ or ¼ in thickness. This belt is made from nylon reinforced rubber. FIG. 16A depicts a belt of the same dimensions as FIG. 16, in which the top layer is made from nylon reinforced rubber while the bottom layer is made from Kevlar. Alternatively, the belt may be all made of Kevlar Aramid. The popularity of Kelvar has risen in the automotive industry as a result of its great tensile strength and non elastic properties. The belt portrayed in FIG. 16B is made entirely of Kevlar, and because of the strength of this material it is possible to reduce the dimensions of the belt. Hence, smaller pulleys with more raceways can be manufactured. This belt is ¼ inches in width at the top, ⅛ inches in width at the bottom. The lengths of the lugs are the same as described above. The belt width is selected to fit the pulley.

With regard to FIGS. 3A, 6, 6A, 7, 13 and any other figure disclosing a shifting slot, it is noted that the shifting slots may extend from 90 to 160 degrees and perhaps over an even wider angle.

Figure 18:
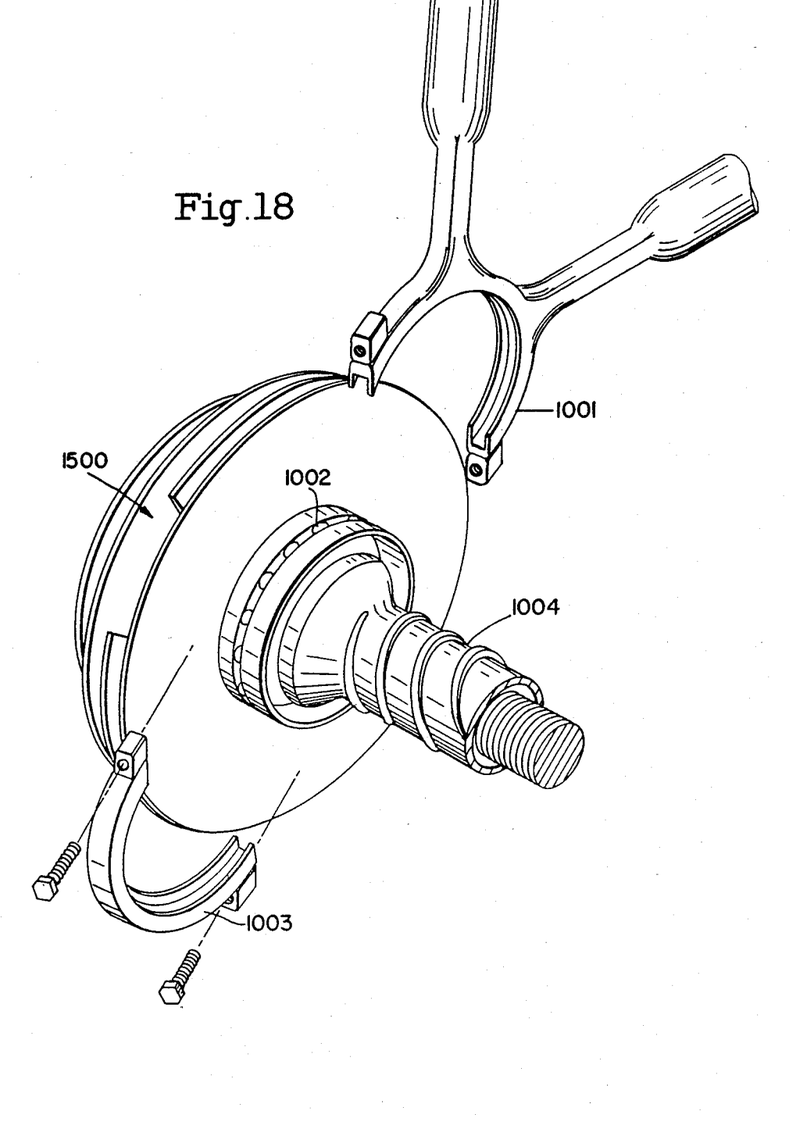
FIG. 18 is a rear isometric view of the rear multiple pulley adapted for replacement of the conventional sprocket.
Figure 19:
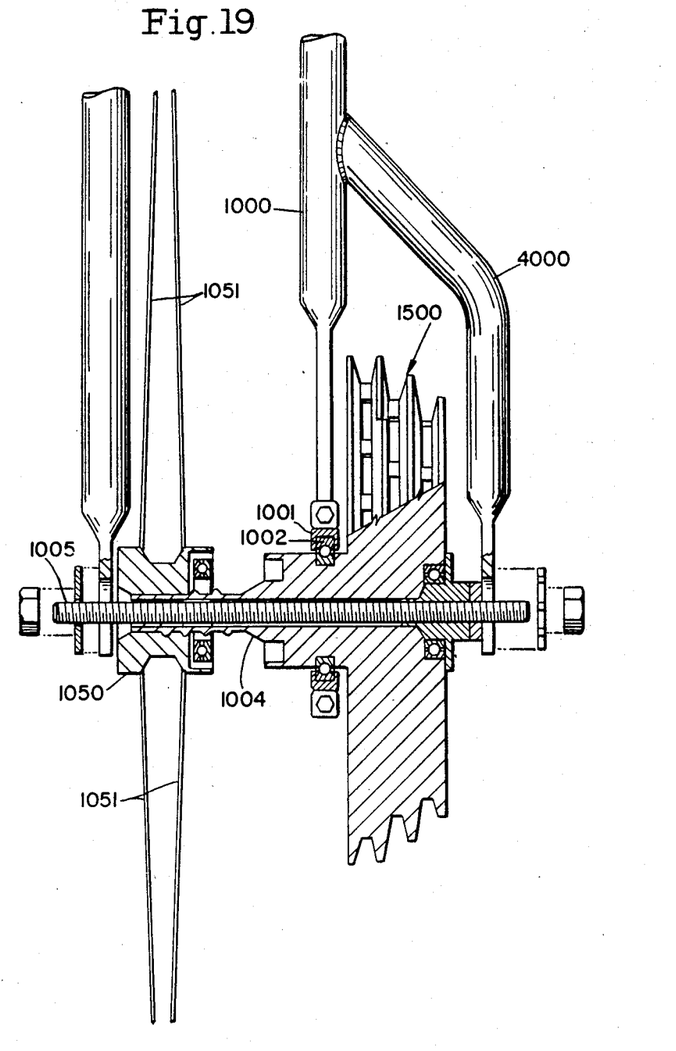
FIG. 19 is a cross sectional rear view of the rear multiple pulley mounted, on a bicycle.

Except as otherwise noted, up to this point the invention has been described as a replacement for the chain in bicycles already built, but it can also be installed on new bicycles at the factory in lieu of the well known chain/sprocket system. The remainder of this detailed description applied to a factory installation. FIGS. 17 and 17A show side views of both the front and rear pulleys as originally installed at the factory. FIG. 18 is a rear isometric view of the rear sprocket including ball bearings 1002, metal lined bearing race 1001, C clamp 1003 and inner wheel spindle 1004. FIG. 19 is a cross sectional view of the rear pulley as installed at the factory.

In FIG. 19 the frame 1000 has a supplemental frame member 4000. The frame 1000 is supported by axle 1005 (including bearings 1002) which is in turn supported by rear wheel 1050. The pulley 1500 is mounted on the axle 1005. The pulley 1500 drives the axle and thus rotates the rear wheel 1050 with spokes 1051. The frame of the bicycle, partly shown in FIG. 19 is made of Kestral 4000, and the frame need not be severed in order to install my new pulley system since that is done as part of the original manufacturing process at the factory. The resulting bicycle can be sufficiently disassembled to allow the substitution of a new tire, or a new drive belt, by simply loosening four nuts in response to which the whole axle drops down so that tires or belts can be changed.

Figure 20:
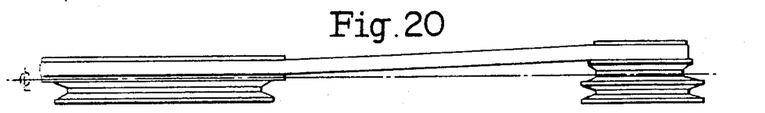
FIGS. 20 to 20E illustrate preferred belt orientations corresponding to various different sized pulleys.
Figure 20A:
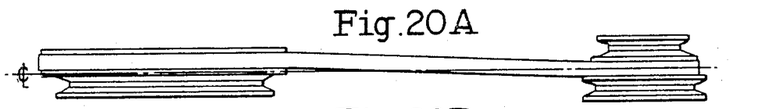
Figure 20B:
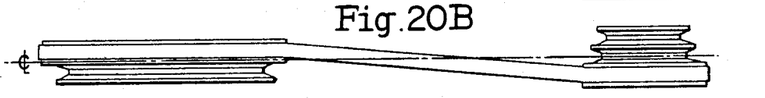
Figure 20C:
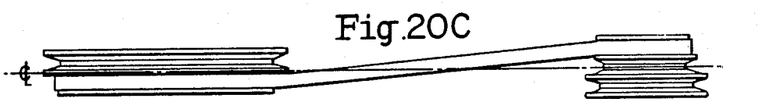
Figure 20D:
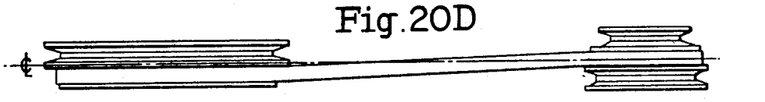
Figure 20E:
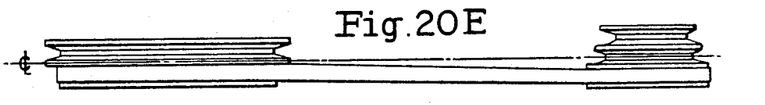
Figure 21:
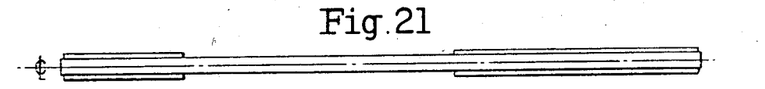
FIGS. 21 to 21C depict different combinations of pulleys.
Figure 21A:
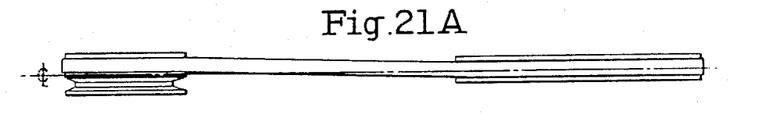
Figure 21B:
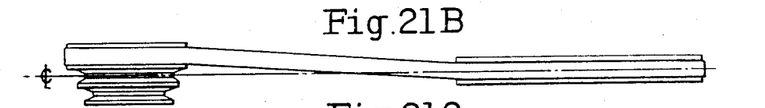
Figure 21C:
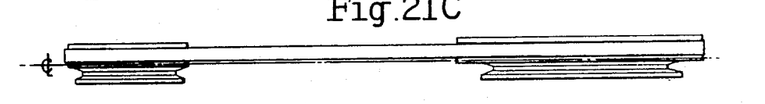

FIGS. 20 to 20E are illustrations of V-belt positions. The rear and front pulleys discussed previously, 1400 and 1500, are capable of supplying six speeds. But the applications are unlimited with the use of narrower V-belts requiring narrower pulleys on existing bicycles and/or modified rear attaching frame members on new bicycles. The centerline between the two pulleys is located to best minimize the V-belt angle in all of its positions. FIG. 20 is the belt arrangement for the Sixth Speed. Similarly, FIGS. 20A to 20E incl. respectively illustrate the belt arrangements for the fifth, fourth, third, second and first speeds. FIGS. 21 to 21C are further combinations of pulley/V-belt systems. FIG. 21 shows the pulley combination for single speed operation, as well as for two or three speeds provided by interval axle shifts. FIGS. 21A, 21B and 21C show the pulley combinations for two, three and four speed operations, respectively. More speeds can be obtained by factory designed bicycles that modify the rear frame to allow clearance for more pulleys. Also a narrower belt will reduce the width of the pulleys, allowing more to be placed on one cluster. Coaster brakes can be added to all speeds except ones with interal rear axle shifting.

Suitable belts for use with my invention are on the market in ½ inch widths and perhaps other widths. Examples of such belts are Dayco #600L050; and Goodyear #BOY60, and #ALPHA60.

The invention has flexibility in that it may be applied to all bicycles past, present and future, as well as new bicycles coming straight from the factory. Moreover, the belt drive system may be designed for application to a large variety of different bicycles uses such as racing, off road, pleasure, exercise, hill climbing, etc.

As other possible embodiments might be made of the present invention, and as various changes might be made in the embodiments above set forth, it is to be understood that all the matter herein described or shown in the accompanying drawings is to be interpreted as illustrative and not in a limiting sense.

OPERATION

From a riders standpoint, the pulley/V-belt conversion systems operates very similar to the well known chain/sprocket system. By engaging the shifting cable 1900 the rider is able to change speeds. However, the mechanical process hat the pulley/V-belt system follows is quite different than that of the chain/sprocket system.

When the cables 1900 are adjusted by the rider, the shifting arms 1830 and the spools 1840 are moved laterally so as to exert lateral pressure on the V-belt 1600. As the pulley rotates, the belt is guided onto a shifting slot 1510 which allows the belt 1600 to slide onto an adjacent raceway. The procedure is identical for the front and rear pulleys, and all shifting is performed while pedaling in the forward direction. After the shifting process is complete the slack adjustment arms 1820 under pressure from the tension wheel 1810, will instant move spools 1840, as needed, in the vertical direction to remove slack from the belt. The process is repeated each time the rider desires a change of speeds.

I claim to have invented:

1. In a bicycle:
front and rear wheels,
a frame inter connecting, and supported by, said front and rear wheels,
a seat on said frame,
steering means connected to said front wheel for steering said bicycle,
rotatable means on said frame, having pedals, for providing power to move the bicycle, said rotatable means including a first pulley rotated by said pedals,
a second pulley for driving said rear wheel,
one of said pulleys comprising a plurality of separate and independent raceways located in different vertical planes,
a belt on said first and second pulleys for driving said second pulley when said first pulley is rotated by pedals, and
belt control means, mounted on said frame, for moving said belt to a selected one of said raceways.

2. In a bicycle as defined in claim 1:
said first pulley having said plurality of raceways.

3. In a bicycle as defined in claim 1,
said second pulley having said plurality of raceways.

4. In a bicycle as defined in claim 1:
said first pulley having said plurality of raceways,
a second pulley having a plurality of raceways in different vertical planes,
said belt control means including means for selecting the raceways, of both of said first and second pulleys, in which said belt operates.

5. In a bicycle as defined in claim 1:
said first pulley having a plurality of raceways of different fixed diameters,
said second pulley having a plurality of raceways of different fixed diameters,
said belt control means including means for selecting the raceway of said first pulley, as well as the raceway of said second pulley, and for also maintaining the belt tight irrespective of the raceways that are selected, so that the driving ratio between said rotatable means and said rear wheel may be changed.

6. In a bicycle:
front and rear wheels,
a frame interconnecting, and supported by, said front are rear wheels,
a seat on said frame,
steering means connected to said front wheel for steering said bicycle,
rotatable means on said frame, having pedals, for providing power to move the bicycle, said rotatable means including a first pulley rotated by said pedals,
a second pulley for driving said rear wheel,
a belt on said first and second pulleys for driving said second pulley when said first pulley is rotated by said pedals, and
belt control means, mounted on said frame, for tightening said belt,
said belt having an upper path from the upper portion of said first pulley to the upper portion of said second pulley and a lower path from the lower portion of said second pulley to the lower portion of said first pulley,
said belt control means including an arm mounted on said frame and having means near one end of the arm for pressing downwardly on said upper portion of said belt, said arm also having means near the other end of said arm for pressing upwardly on said lower portion of said belt; for thereby tightening said belt.

7. In a bicycle as defined in claim 6 in which said arm is rotatably mounted on said frame, and
biasing means tending to rotate said arm to thereby apply downward pressure on the upper portion of said belt and upward pressure on said lower portion of said belt; to thereby tighten said belt.

8. In a bicycle:
front and rear wheels,
a frame interconnecting, and supported by, said front and rear wheels,
a seat on said frame,
steering means connected to said front wheel for steering said bicycle,
rotatable means on said frame, having pedals, for providing power to move the bicycle, said rotatable means including a first pulley rotated by said pedals,
a second pulley for driving said rear wheel, a belt on said first and second pulleys for driving said second pulley when said first pulley is rotated by said pedals, belt control means, mounted on said frame, for tightening said belt, said first pulley having a plurality of raceways, partition means for interconnecting two of said raceways, said partition means defining an opening between said two raceways for allowing the belt to move from one of said two raceways to the other of said two raceways, said second pulley having a plurality of raceways, and second partition means for interconnecting two of the raceways of said second pulley, said second partition means defining an opening between said two raceways of said second pulley for allowing the belt to move from one of said two raceways of the second pulley to the other of said two raceways of the second pulley, said belt control means comprising an arm pivoted for rotation to said frame, said arm extending away from said pivot in two opposite directions, and forming two belt contacting elements one at each end of the arm, one of said belt contacting elements comprising means for applying pressure on the belt laterally when it is desired to shift from one of said raceways of the first pulley to another raceway of the first pulley to thereby shift raceways and for applying vertical pressure on the belt to tighten the belt.

9. In a bicycle, front and rear wheels, a frame interconnecting, and supported by, said front and rear wheels, a seat on said frame, steering means connected to said front wheel for steering said bicycle, rotatable means on said frame, having pedals, for providing power to move the bicycle, said rotatable means including a first pulley rotated by said pedals, a second pulley for driving said rear wheel, a belt on said first and second pulleys for driving said second pulley when said first pulley is rotated by said pedals, belt control means, mounted on said frame, for tightening said belt, one of said pulleys having a plurality of raceways, and partition means for interconnecting two of said raceways, said partition means defining an opening between said two raceways for allowing the belt to move from one of said two raceways to the other of said two raceways, said belt control means comprising belt contacting means for shifting raceways by applying pressure on the belt laterally when it is desired to shift from one of said raceways to another raceway, and for applying vertical pressure on the belt to tighten the belt.

10. In a bicycle:

a frame, a front wheel, steering means for steering the bicycle by moving the front wheel, rotatable means mounted on said frame including a first pulley and pedals for rotating said first pulley, a rear wheel, a second pulley for driving said rear wheel, said front an rear wheels supporting said frame, a belt driven by said first pulley, for driving the second pulley, one of said pulleys having a plurality of raceways, partition means separating two of said raceways, said partition means defining an opening for allowing said belt to be shifted from one of said two raceways to the other, and control means mounted on said frame, for shifting said belt from one of said two raceways to the other.

11. In a bicycle as defined in claim 10:

the other of said pulleys having a plurality of raceways, second partition means for separating two of said raceways of said other pulley, said second partition means defining an opening for allowing said belt to be shifted from one to the other of the raceways of said other pulley, and said control means including means for positioning said belt in a selected one of said two raceways of said first pulley and in a selected one of said two raceways of the second pulley and for shifting raceways while said bicycle is in motion.

12. In a bicycle as defined in claim 11:

said belt having upper and lower paths, said control means including means for shifting the belt from one raceway to another raceway of the first pulley by applying lateral pressures to the upper path of said belt.

13. In a bicycle as defined in claim 11:

said belt having upper and lower paths, said control means including means for shifting the belt from one raceway of the second pulley to another raceway of the second pulley to another raceway of the second pulley by applying lateral pressure to the belt along its lower path.

14. In a bicycle as defined in claim 11:

said control means also including means for applying vertical pressure on a portion of the belt between the pulleys to tighten the belt.

15. In a bicycle as defined in claim 11, in which said control means comprises an elongated arm and pivot means on said frame for allowing said arm to rotate about said pivot means, said arm having a central portion and being pivoted to said frame at or near the midpoint of the length of the arm, said arm including a limited portion thereof near one end thereof for engaging the portion of the belt entering said first pulley and which is movable laterally with respect to said central portions to shift tee belt from one raceway of the first pulley to another raceway of the first pulley, said arm including a limited portion thereof near its other end for engaging the portion of the belt entering said second pulley and which is movable laterally with respect to said central portion to shift the belt from one raceway of the second pulley to another raceway of the second pulley.

16. In a bicycle as defined in claim 15:

said belt having upper and lower paths of travel between said pulleys, one of said limited portion engaging the a portion of said belt n said upper path and the other limited portion engaging a portion of sad belt in its lower path, and said control means including means for tightening the belt comprising: biasing means for biasing said arm in an angular direction so that the first-named limited portion applies downward pressure on the portion of the belt in said upper path and the second-named limited portion applies upward pressure on the portion of the belt in said lower path.

17. In a bicycle:
front and rear wheels,
a frame interconnecting said wheels and supported thereby,
steering means, connected to said front wheel, for steering said vehicle,
a first pulley for driving said rear wheel,
a second pulley supported by said frame,
means for rotating said second pulley,
a belt driven by said second pulley for driving said first pulley to drive said rear wheel,
one of said pulleys having a plurality of coaxial raceways located in different vertical planes and having different fixed diameters,
a seat on said frame for carrying the rider of said bicycle, and
control means under the control of said rider for shifting the belt to a selected one of said raceways.

18. In a bicycle, which may travel in a path along the ground, as defined in claim 17,
said control means comprises means for shifting said belt by applying thereto pressure in a direction parallel to the ground and perpendicular to said path of travel.

19. In a bicycle as defined in claim 17, having means for keeping the belt tight by applying vertical pressure to it, said belt being a V-belt.

20. In a bicycle as defined in claim 17,
said belt having a series of evenly spaced raised portions,
at least one of said pulleys defining receiving means for receiving said raised portions so that the belt makes positive engagement with said one pulley.

21. In a bicycle as defined in claim 17,
means mounted on said frame for applying vertical pressure to said belt to keep it tight.

22. In a bicycle as defined in claim 18 in which said control means includes means for applying vertical pressure to said belt to keep the belt tight.

23. In a bicycle as defined in claim 17 in which both of said pulleys have at least two raceways,
said belt including an upper path of travel from the first to the second pulley and a lower path of travel from the second to the first pulley,
said control means including a first control means that applies downward pressure on the belt along its upper path and for moving laterally to shift the belt from one to another of the raceways of the second pulley and also including a second control means that applies upward pressure on the belt along its lower path and for moving laterally to shift the belt from one to another of the raceways of the first pulley.

24. In a bicycle as defined in claim 23
said control means including an arm pivotally mounted on said frame and having said first control means near one end of said arm and said second control means near the other end of said arm.

* * * * *